Patented Dec. 2, 1924.

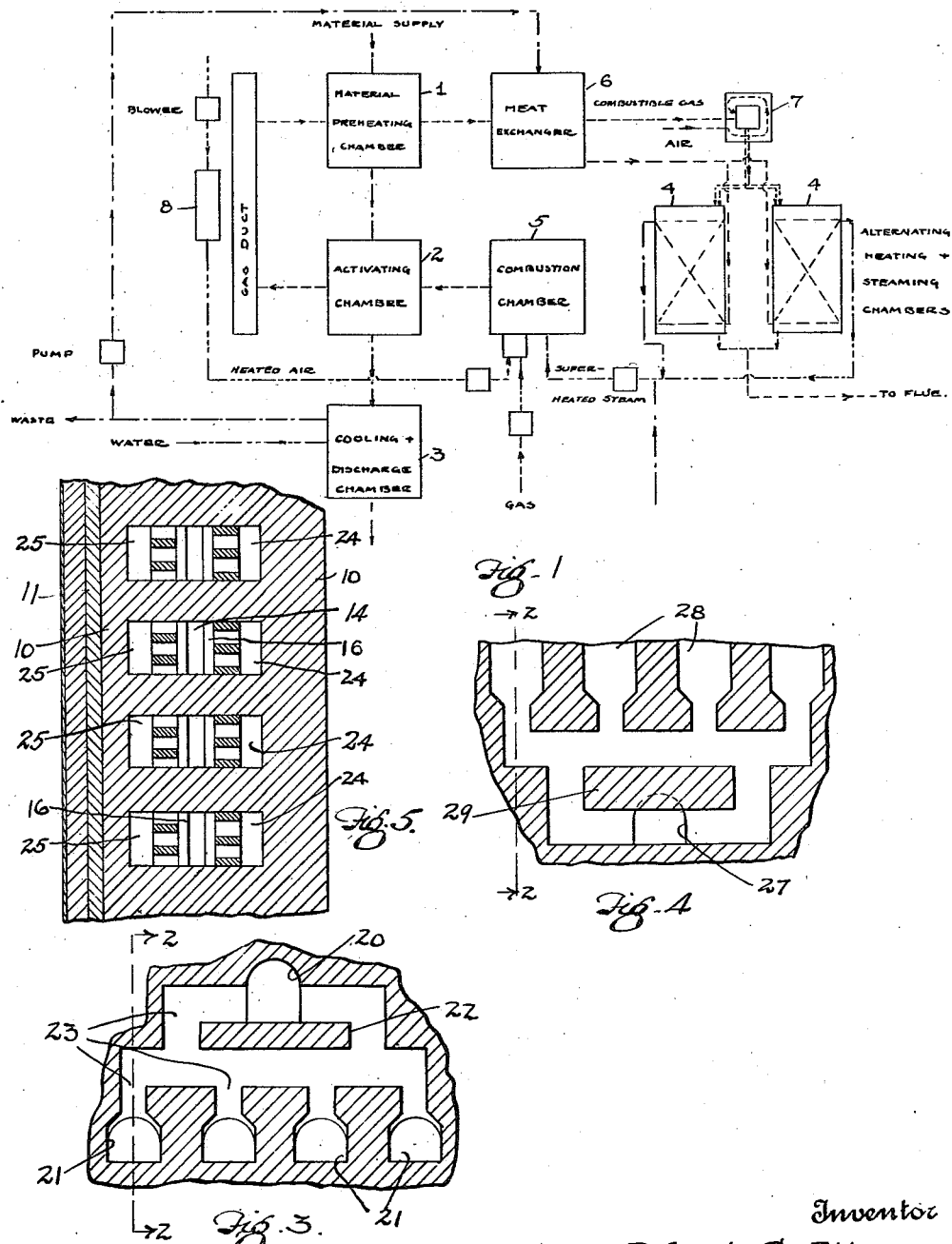

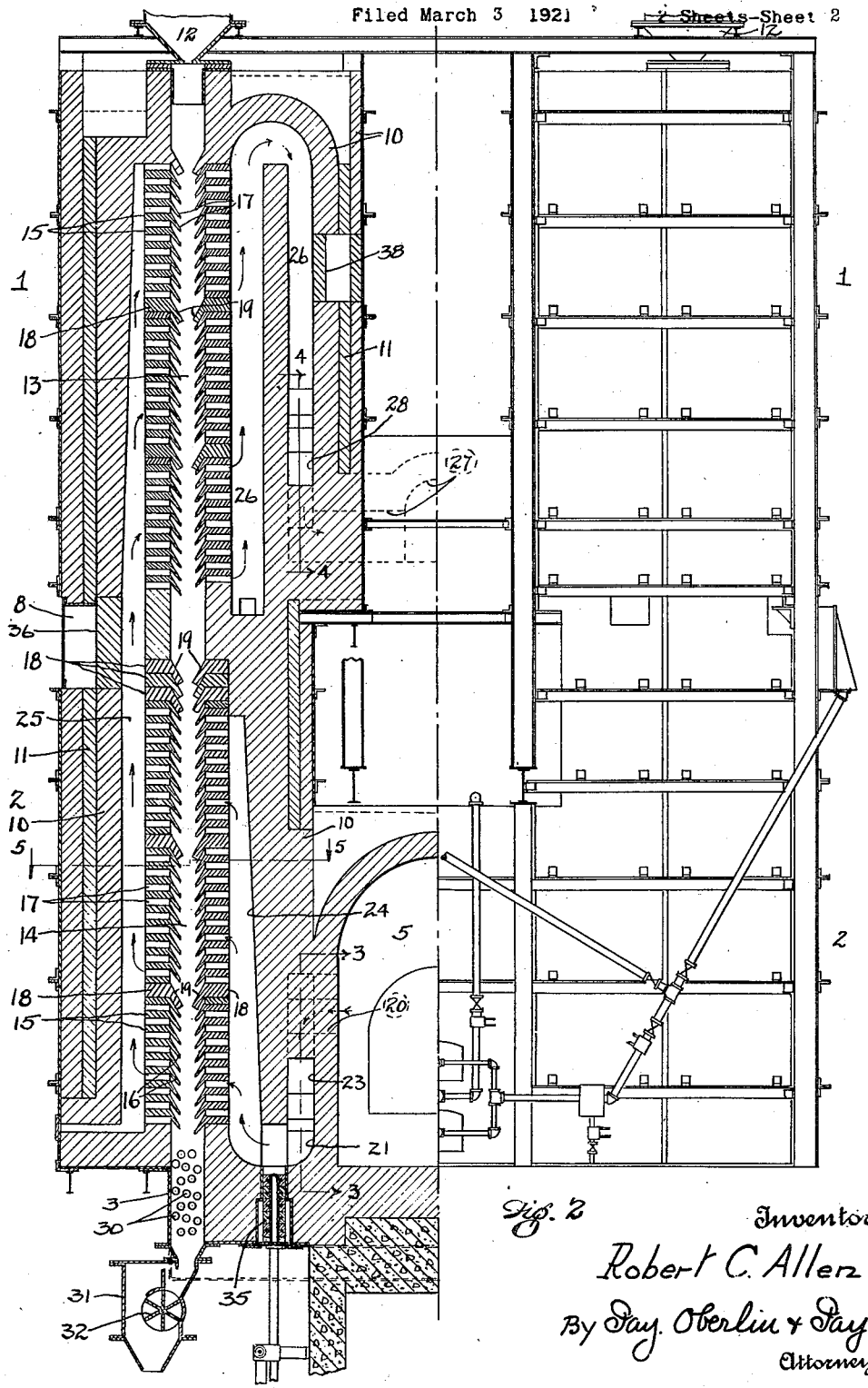

1,517,523

UNITED STATES PATENT OFFICE.

ROBERT C. ALLEN, OF LAKEWOOD, OHIO, ASSIGNOR TO HENRY L. DOHERTY & COMPANY, OF NEW YORK, N. Y.

METHOD OF AND APPARATUS FOR ACTIVATING CHARCOAL.

Application filed March 3, 1921. Serial No. 449,303.

*To all whom it may concern:*

Be it known that I, ROBERT C. ALLEN, a citizen of the United States, and a resident of Lakewood, county of Cuyahoga, and State of Ohio, have invented a new and useful Improvement in Methods of and Apparatus for Activating Charcoal, of which the following is a specification, the principle of the invention being herein explained and the best mode in which I have contemplated applying that principle, so as to distinguish it from other inventions.

The value of specially prepared forms of carbon as an absorbent and purifying agent has long been recognized, and the availability of specially prepared charcoal for the absorption of vapors was noted and reported upon by John Hunter many years ago, (see Chemical Society Journal, London, 111, 285; V, 160; VI, 186; VIII, 73; X, 649). In spite, however, of the early work of Hunter and subsequent researches by other investigators in the field, it remained until the war of 1914 created a demand for an efficient agent to absorb from the atmosphere the poisonous gases employed in chemical warfare, before such utilization of charcoal or carbon has promised to assume commercial proportions. It is true that in the interval there was a development of so-called decolorizing carbons as a substitute for bone-black in removing suspended solids, mineral ash, etc., from solutions or liquids to be purified. The specially prepared carbon or charcoal which is employed in gas masks, however, and which is now coming into more or less general commercial use, apparently possesses a considerably greater degree of activity, and for this reason, and also because certain physical, and perhaps chemical changes, in the form of the carbon are involved, this improved product has come to be known as activated charcoal, or activated carbon.

The present invention accordingly relates, as indicated to a method of and apparatus for producing carbon or charcoal of this activated type, and has as its object the provision of means whereby such activation may be carried on continuously and economically. To this end the invention consists of the means and steps hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a diagram representing, after the fashion of a flow sheet, the general arrangement of the apparatus employed and the manner in which the material being treated, as well as the activating agents are handled therein; Fig. 2 is partly a side elevation and partly a central section of an apparatus embodying the present improvements and adapted to carry out my present improved process; and Figs. 3, 4 and 5 are transverse sections of details of such apparatus, the planes of such sections being indicated by the lines 3—3, 4—4 and 5—5, respectively, on Fig. 2.

In order to activate carbon, and particularly carbonaceous materials, such as woods and coals which contain a considerable amount of volatile matter, it seems to be necessary that the last traces of hydrocarbons be removed. The sources of such hydrocarbons have been found to be the organic compounds which exist in the carbonaceous materials before distillation, or are produced during such distillation. Accordingly, by removal of these compounds during distillation an activated carbon may be produced directly which does not require a subsequent activating process. In my present improved process and apparatus, accordingly, I provide for the distillation of the carbonaceous material in refractory retorts where the temperature is raised preferably between 700° and 1000° C., admitting steam during the distillation period so as to oxidize selectively the hydrocarbons and thus free the pores of the carbon from substantially all traces thereof, as well as to carry the gases and vapors away from the carbon and so prevent them from cracking and leaving a deposit of inactive carbon or hydrocarbons in the pores or on the surface of the residual carbon structure.

It will be understood of course that a great variety of materials may be utilized as the source of activated carbon, prepared in accordance with the general process just described, and the present process and apparatus are obviously not limited to use with any such particular raw material. As an example of such material that has been found very satisfactory in use I may refer to broken cocoanut shells, the form and texture of which lend themselves admirably to the production of a satisfactory grade of activated carbon or charcoal.

Referring then to Fig. 1 of the drawings it will be noted that such raw material is initially received in a preheating chamber 1, from which it is directly passed to an activating chamber 2, and thence to a cooling and discharge chamber 3. As will be presently explained, the apparatus comprising the three chambers just referred to is so arranged and constructed that the material to be treated may be passed therethrough in practically a continuous stream. For the purpose of maintaining such activating chamber or retort 2 at the proper temperature, as well as to provide the steam and other vapors required for reaction with the material in accordance with the general process outlined above, water or steam is alternately passed through one or the other of paired heating and steaming chambers 4, and the resultant superheated steam thence conducted to a combustion chamber 5, where the proper amount of gas and air are admitted and ignited. The mixture of the products of combustion with the steam, which in such case constitutes the activating medium, is conducted from such combustion chamber around and through chamber 2, and then in turn around and through the material preheating chamber 1, which will ordinarily be located above the chamber 2, not only to permit the feeding of the material to be treated through the apparatus by gravity, but also to facilitate the transfer of the gases, after leaving the chamber, to said preheating chamber.

After leaving the latter the gases will still be relatively quite hot and they are accordingly passed through a heat exchanger 6, wherein they are utilized to heat the water subsequently employed in chambers 4 to provide the necessary superheated steam for use in the chamber 2. A blower 7 assists in maintaining the circulation of the gases and also the admixing therewith of the proper quantity of air so as to provide a combustible mixture in the particular chamber 4 that is being heated. It will be understood that said chambers 4 are filled with checker work or the like, and that after one such chamber has been heated to the proper temperature in the manner just described, the mixture of combustible gases thereto is shut off and the hot water, either as a spray, or in the form of steam, from the heat exchanger caused to pass therethrough, while the other chamber 4 is in turn being heated. The gases thus used in alternately heating chambers 4 finally pass to a flue as indicated on Fig. 1.

The air admixed with the gas used in combustion chamber 5 is preferably drawn through an air heated duct 8 disposed either adjacent to preheating chamber 1, chamber 2, or the path of the gases from the latter to the former so as to be preheated and thus assist in maintaining the proper temperature in the activating medium delivered from such combustion chamber to the activating chamber. Furthermore, the water employed in the heat exchanger 6 is preferably that used in the material cooling and discharge chamber 3, so that the cooling of the material at this stage does not result in a waste of heat.

As shown in Fig. 2 the preheating and activating chambers are preferably included in a unitary structure in the nature of a retort and plural retorts are then arranged in pairs, one such pair being shown in the figure in question. The retort at the right is shown in full front elevation, while the one at the left is shown in central section. Such retorts being of identical construction, it will suffice to describe in detail the one thus shown in section, it being understood of course that a single retort may be used as a plant unit instead of such pair or pairs if desired. The general form of the retort in horizontal cross-section, as shown in Fig. 5, is rectangular, the walls being formed of fire brick 10 with a layer of insulation 11 interposed where desirable between the same on the exterior, of common brick. Within such outer walls, and likewise of general rectangular form, is an interior column or passageway, through which the material from a feed hopper 12 is allowed to descend, such column or passageway being spaced from two opposite walls, as shown in Fig. 5. This column or passageway is divided at approximately its mid-point into two similar sections 13 and 14, the upper of which constitutes the pre-heating, the lower the activating chamber, previously referred to in describing Fig. 1. Thus the spaced walls of both sections of the passageway are in the main built up of fire brick 15, formed with depending flanges 16 along their inwardly directed edges, there being interposed between said brick 15, standard fire brick 17, transversely arranged so as to space the same apart and provide passageways therebetween. The effect of the foregoing arrangement is to provide a series of louver-like openings throughout the entire length of the section 13 or 14 as the case may be. The material as it passes down through the retort passage will tend to rest on the flanges 16 without, however, clogging the openings between successive bricks 15, and as the column of material is allowed to descend, in sliding off such flanges it is turned over and over, thus continuously intermixing the mass and exposing fresh surface to the gases passing through the aforesaid openings. To further accentuate such turning and mixing of the material, larger bricks 18 with flanges 19 that project further into the passageway are provided at intervals, and a series of similar bricks are also provided at the beginning of the second section 14 of the passageway, to mark the point of division between the two sections. The walls of the passage are preferably smooth for a short distance above such last-mentioned bricks 18.

While the walls of the passageway have been described as being built up of fire brick, any material that is sufficiently resistant to the temperature that may be employed is to be understood as coming within this designation.

Combustion chamber 5, in the practical development of the apparatus as illustrated in Fig. 2, is located, it will be noted, between the pair of retorts 2 and the activating medium from said chamber 5 is conducted directly through a suitable passageway 20 in the adjacent wall of the retort to a series of transversely spaced openings 21 (four as shown) that respectively lead into the bottoms of the corresponding retorts. As shown in Fig. 3, a baffle 22 is interposed between the passage just referred to, and interconnecting passages 23 are so arranged that such activating medium is uniformly distributed transversely of the columns of material lying within the passages 14. Furthermore, the space 24 between the retort wall in question and the adjacent louver-wall, defining such passage, gradually decreases in width, as shown in Fig. 2, so that the pressure of the gases will be substantially uniform throughout the length of the column of material lying in such passage section 14.

After passing through the louver-walls of the lower section of the passage the gases are collected in a duct 25 on the outside of the passage in question, such duct extending upwardly laterally adjacent to the upper passage section 13, and gradually decreasing in width from the lower to the upper end of said section. After passing transversely through the louver-walls composing this section of the passage, the gases are collected in a series of ducts 26 (four as shown) that lead to an outlet 27 in communication with the heat exchanger 6. In order to equalize the back pressure in said ducts 26 transversely of the adjacent louver-wall of passage section 13, a baffle 29 is interposed opposite the discharge ends 28 of said ducts, as best shown in Fig. 4.

The cooling chamber 3 consists in effect of an extension of the lower retort section 14, in which are disposed a number of cooling coils 30, as shown in Fig. 2, such cooling chamber terminating in a discharge hopper 31, and being closed by means of a rotating valve 32 or equivalent device whereby the material may be discharged at a constant rate from said cooling chamber while still leaving the latter sealed.

In order that a retort forming one of a series may be shut off for the purpose of inspection or repair a water cooled gate-valve 35 is arranged so that it may be inserted in the passageway between combustion chamber 5 and the duct 24. By simply raising such valve from the position shown in Fig. 2, this duct may be completely closed without interrupting the supply of the activating medium to a companion retort supplied from the same combustion chamber. The air heating duct 8 is conveniently formed directly in the retort wall, as shown in Fig. 2, such wall being suitably reduced in thickness adjacent such duct to insure adequate heating of the air as it is carried therealong on its way to the combustion chamber. The adjacent portion of the retort wall preferably consists of a panel 36 separately built or set into the retort wall, and so serves as an explosion panel to relive excessive pressure within the retort in the event of the gases or other material therein developing an explosive mixture, and similar explosion panel 38 may be set in the wall of the upper retort section.

From the foregoing description of the retort proper it will be seen that the material is caused to pass therethrough more or less continuously, depending upon the operation of the outlet valve 32, and that, as it does pass through the successive sections 13 and 14, such material is subjected to a turning and mixing action, due to the projecting louvers 16 and 19. The latter at the same time serve to prevent the transverse openings in the passage sections from becoming clogged with the material. The degree of slant of the flanges or louvers 16 may be varied, depending upon the character of the material being treated, but in handling charred carbonaceous material, such as has hereinbefore been referred to, an angle of more than 30° to the horizontal will be desirable. This angle, in other words, is determined by the so-called angle of repose of the material. As the column of material thus gradually moves downwardly through the several sections of the retorts, the activating medium from combustion chamber 5 is caused to traverse that portion of the column in the lower section and there react with the material to activate the same in a fashion that need not be described with special detail in the present connection, since the chemistry of such reaction forms no part of the present invention. It will be noted, however, that the activating medium used in this activating stage should be maintained at approximately 1000° C. The residual gases, somewhat reduced in temperature, are thence conducted to the upper portion of the retort, which constitutes the preheating chamber, and there caused again to traverse the column of material, this time the upper section thereof, with the result that such material, by the time it reaches the activating chamber proper, will be raised to approximately 700° C. The operation of the apparatus or plant as a whole has been sufficiently indicated in connection with the description of Fig. 1 not to require further explanation in connection with the detail description of the retort as illustrated in Fig. 2. It may again be noted, however, that the gases, after serving the purpose of preheating the material, are then utilized in the heat exchanger 6 to preheat the water that is subsequently converted into steam in one or the other of chambers 4; also that such water is, previously to the foregoing stage of the operation, initially heated in passing through the coils 30 in cooling chamber 3. At the same time the air employed in combustion chamber 5 is preliminarily heated in the duct 8 by the gases in passing from the material activating to the material heating stage.

While the apparatus has been designed primarily for the treatment of raw carbonaceous material, whereby the latter may in one operation be converted into activated carbon, it will be understood that such apparatus may also be advantageously used in treating pre-charged material to render the same thus active; also that it may be employed in a variety of different processes involving the roasting, distilling, impregnating or drying of materials, or other analogous treatment thereof.

While, as hereinbefore described, the apparatus is designed to provide for the admixture with the steam from chamber 4 of products of combustion generated in chamber 5, the products in question may not be necessary in certain cases, but the steam conducted directly to the activating chamber. In other words, no air and gas need be admitted and ignited in said chamber 5 unless the particular grade of material being activated so requires, and the term "activating medium" as herein employed is to be understood as including super-heated steam with or without the addition of such products of combustion. Where steam alone is used, chamber 5 becomes merely a distributing chamber.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. In a process of the character described, the step which consists in passing an activating medium transversely through a moving body of carbonaceous material.

2. In a process of the character described, the steps which consist in passing an activating medium transversely through a moving body of carbonaceous material, and then repassing the resultant gaseous products through such column in advance of such first step, in order to pre-heat such material.

3. In a process of the character described, the steps which consist in passing an activating medium comprising superheated steam transversely through a moving column of carbonaceous material, repassing the resultant gaseous products through such column in advance of such first step, in order to pre-heat such material, and then employing such resultant gases to heat a steaming chamber for generating such super-heated steam.

4. In a process of the character described, the steps which consist in passing an activating medium comprising superheated steam transversely through a moving body of carbonaceous material, repassing the resultant gaseous products through such column in advance of such first step, in order to pre-heat such material, employing such resultant gases to pre-heat water, and then alternately heating a chamber with such gases and admitting such water thereto for generating the super-heated steam used in the first step.

5. In a process of the character described, the steps which consist in passing a mixture of super-heated steam and products of combustion transversely through a moving body of carbonaceous material, repassing the resultant gaseous products through such column in advance of such first step, in order to pre-heat such material, employing such resultant gases to heat a steaming chamber for generating such super-heated steam, and admixing with the latter an ignited combustible mixture of gases prior to use in the first step.

6. An apparatus of the character described, including pre-heating, activating and cooling chambers through which the material to be treated may be passed in succession, a combustion or distributing chamber connected with said activating chamber, a gas duct leading from the latter to said pre-heating chamber, and a steam-generating chamber connected to receive gases from said preheating chamber and to supply steam to said combustion chamber.

7. An apparatus of the character described, including pre-heating, activating and cooling chambers through which the material to be treated may be passed in succession, a combustion or distributing chamber connected with said activating chamber, a gas duct leading from the latter to said pre-heating chamber, and paired steam-generating chambers adapted alternately to receive gases from said pre-heating chamber and to supply steam to said combustion chamber.

8. An apparatus of the character described, including pre-heating, activating and cooling chambers through which the material to be treated may be passed in succession, a combustion chamber connected with said activating chamber, a gas duct leading from the latter to said pre-heating chamber, a steam-generating chamber connected to receive gases from said pre-heating chamber and to supply steam to said combustion chamber, and water coils in said cooling chamber for cooling the material in passing therethrough, said coils being connected to said steam-generating chamber for supplying water thereto.

9. An apparatus of the character described, including pre-heating, activating and cooling chambers through which the material to be treated may be passed in succession, a combustion chamber connected with said activating chamber, a gas duct leading from the latter to said pre-heating chamber, a steam-generating chamber connected to receive gases from said pre-heating chamber and to supply steam to said combustion chamber, water coils in said cooling chamber for cooling the material in passing therethrough, said coils being connected to said steam-generating chamber for supplying water thereto, and a heat-exchanger through which such water and gases pass before entering said steam-generating chamber.

10. In an apparatus of the character described, a retort comprising outer walls, and an inner passage for the material to be treated spaced from such walls on two opposite sides, whereby ducts are formed more or less co-extensive with such passage, the walls of the latter being built of spaced brick having inwardly directed flanges forming louvers, the angles of such flanges being greater than the angle of repose of the material in question, and other similar brick at intervals in said passage forming constrictions therein.

11. In an apparatus of the character described, a retort comprising outer walls, and an inner passage for the material to be treated spaced from such walls on two opposite sides, whereby ducts are formed more or less co-extensive with such passage, the walls of the latter being perforate whereby gases may pass therethrough and such passage being constricted at intervals, substantially as described.

Signed by me, this 1st day of March, 1921.

ROBERT C. ALLEN.